United States Patent
Nakabayashi et al.

(10) Patent No.: US 7,480,133 B2
(45) Date of Patent: Jan. 20, 2009

(54) HEAD MOUNTED APPARATUS

(75) Inventors: Takaaki Nakabayashi, Ohta-ku (JP);
Yoshihiro Saito, Hachioji (JP);
Toshiyuki Okuma, Chofu (JP); Toshiki Ishino, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 11/478,717

(22) Filed: Jun. 30, 2006

(65) Prior Publication Data
US 2007/0018908 A1 Jan. 25, 2007

(30) Foreign Application Priority Data
Jul. 4, 2005 (JP) .............. 2005-194623

(51) Int. Cl.
*G06F 1/16* (2006.01)
(52) U.S. Cl. .................. 361/683; 361/681; 345/8; 2/422
(58) Field of Classification Search ........... 361/679, 361/681, 683; 2/422; 345/8; D14/372
See application file for complete search history.

(56) References Cited

U.S. PATENT DOCUMENTS

| | | | | |
|---|---|---|---|---|
| 5,757,339 A | * | 5/1998 | Williams et al. | 345/8 |
| 5,774,096 A | * | 6/1998 | Usuki et al. | 345/8 |
| 5,986,813 A | * | 11/1999 | Saikawa et al. | 359/630 |
| 6,356,437 B1 | * | 3/2002 | Mitchell et al. | 361/683 |
| 6,369,952 B1 | * | 4/2002 | Rallison et al. | 359/630 |
| 6,515,853 B2 | | 2/2003 | Saito | |
| 2004/0003453 A1 | * | 1/2004 | Urakawa et al. | 2/422 |

FOREIGN PATENT DOCUMENTS

| | | |
|---|---|---|
| JP | 3042353 | 3/2000 |
| JP | 3576985 | 7/2004 |

* cited by examiner

*Primary Examiner*—Jayprakash N Gandhi
*Assistant Examiner*—Anthony Q Edwards
(74) *Attorney, Agent, or Firm*—Morgan & Finnegan, L.L.P.

(57) ABSTRACT

A head mounted apparatus mounted on a head of a user includes an apparatus body to be mounted on a front side of the head, a frame for supporting the apparatus body, the frame extending in a longitudinal direction at both sides of the head when the frame is mounted on the head, a front compressing portion provided on the frame or the apparatus body, and compressed against a frontal region of the head, first and second adjusters provided at both sides of the frame so that the first and second adjusters can move in the longitudinal direction relative to the frame, a back member that includes a back compressing portion compressed against an occipital region of the head, and is held by the first and second adjusters, and an interlock mechanism for enabling, as one of the first and second adjusters moves relative to the frame, the other of the first and second adjusters to move with the same moving amount relative to the frame in the same direction as the one.

9 Claims, 6 Drawing Sheets

HEAD MOUNTED APPARATUS

BACKGROUND OF THE INVENTION

The present invention relates to a head mounted type equipment or head mounted apparatus, such as a head mounted display, and more particularly to a head mounted apparatus that includes an attachment or mount mechanism to be mounted on a user's head.

A head mounted display is widely used because of easy image viewing on a wide screen, easy formations of stereoscopic visions, and mobility with a user. A mount mechanism holds the head mounted display on the front head side and includes a portion compressed against the frontal region, and a portion compressed against the occipital region. The mount mechanism fits the head by moving forward the occipital-region compressing portion after these portions are positioned at the front and back of the head. An adjusting mechanism that adjusts an interval between the frontal-region and occipital-region compressing portions to the head size can be provided on the left and right sides or on the backside of the head.

The mount mechanism that includes the adjusting mechanism at both sides of the head is disclosed, for example, in Japanese Patent No. 3,576,985 (FIG. 1 etc. corresponding to U.S. Pat. No. 6,515,853).

The mount mechanism that includes the adjusting mechanism at the backside is disclosed, for example, in Japanese Patent No. 3,042,353 (FIGS. 2 and 3 etc.). The adjusting mechanism in this mount mechanism includes a rotating drum having a projection, a left band that extends from the left temporal region to the occipital region, and a right band that extends from the right temporal region to the occipital region. Each band has plural holes engageable with the projection of the rotating drum. Among the pair of bands, the holed portions oppose to each other with respect to the rotating center of the rotating drum. Thus, a rotation of the rotating drum would loosen or fasten both bands. In mounting the mount mechanism on the head, one hand grasps the mount mechanism and the other hand rotates the back rotating drum in the band fastening direction, fixing the head.

However, the mount mechanism disclosed in U.S. Pat. No. 3,576,985 is a type that adjusts the left and right adjusting mechanisms independently, causing different left and right adjusting amounts. In particular, an elastic band that holds the occipital-region compressing portion provides the left and right adjusting amounts with a large degree of freedom, causing the occipital-region compressing portion to laterally shift relative to the frontal-region compressing portion, and making the attachment unstable. In addition, in that case, a laterally asymmetrical force applied to the occipital region causes a user to feel uncomfortable. The adjusting mechanism using a ratchet mechanism problematically generates noises during adjustment, and its stepwise adjustments cannot provide sufficiently fine mount capability.

A big-head user attempting to put on the mount mechanism after a small-head user puts it on needs to arduously unlock the ratchet mechanism and retreat the occipital-region compressing portion. In addition, since the unlocking direction and the retreating direction of the occipital-region compressing portion are different, two steps operations are needed and lower the operability.

On the other hand, the mount mechanism disclosed in Japanese Patent No. 3,042,353 requires one hand to support the head mounted apparatus and the other hand to manipulate the adjusting mechanism, posing bad manipulating or mounting problems.

BRIEF SUMMARY OF THE INVENTION

The present invention is directed to a head mounted apparatus having a mount mechanism with a simple structure and good mounting and manipulating capabilities.

A head mounted apparatus according to one aspect of the present invention mounted on a head of a user includes an apparatus body to be mounted on a front side of the head, a frame for supporting the apparatus body, the frame extending in a longitudinal direction at both sides of the head when the frame is mounted on the head, a front compressing portion provided on the frame or the apparatus body, and compressed against a frontal region of the head, first and second adjusters provided at both sides of the frame so that the first and second adjusters can move in the longitudinal direction relative to the frame, a back member that includes a back compressing portion compressed against an occipital region of the head, and is held by the first and second adjusters, and an interlock mechanism for enabling, as one of the first and second adjusters moves relative to the frame, the other of the first and second adjusters to move with the same moving amount relative to the frame in the same direction as the one.

A head mounted apparatus according to another aspect of the present invention mounted on a head of a user includes an apparatus body to be mounted on a front side of the head, a frame for supporting the apparatus body, the frame extending in a longitudinal direction at both sides of the head when the frame is mounted on the head, a front compressing portion provided on the frame or the apparatus body, and compressed against a frontal region of the head, first and second adjusters provided at both sides of the frame so that the first and second adjusters can move in the longitudinal direction relative to the frame, each adjuster including a lock mechanism for locking and unlocking a unidirectional movement of the adjuster in the longitudinal direction relative to the frame, an unlocking direction of the lock mechanism being the same as a direction of the unidirectional movement, and a back member that includes a back compressing portion compressed against an occipital region of the head, and is held by the first and second adjusters.

Other objects and further features of the present invention will become readily apparent from the following description of the preferred embodiments with reference to the accompanying drawings.

DETAILED DESCRIPTION OF THE PREFERRED EMBODIMENTS

Referring now to the accompanying drawings, a description will be given of a preferred embodiment of the present invention.

First Embodiment

Figure 1:
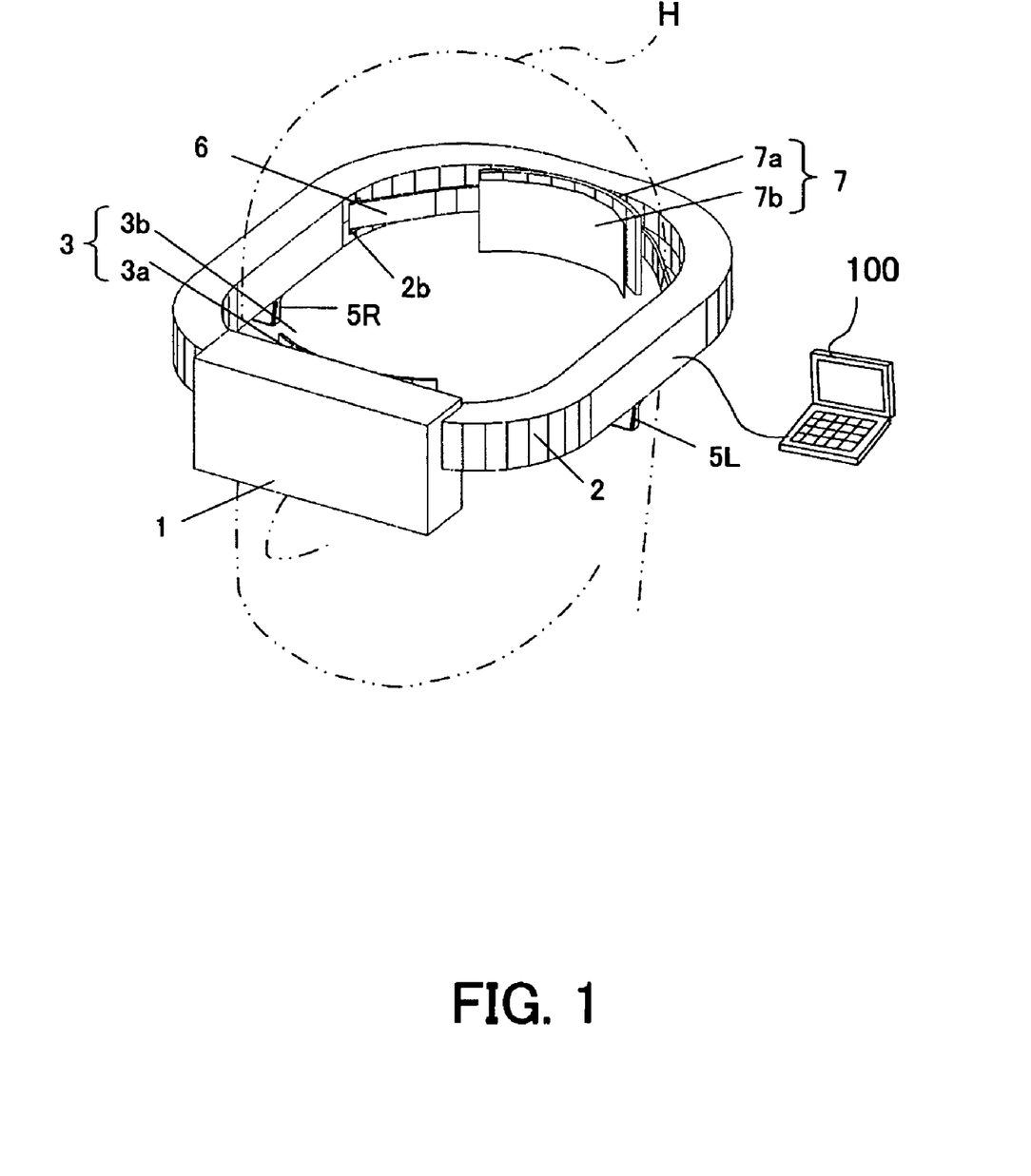
FIG. 1 is a perspective view of a head mounted apparatus system according to a first embodiment of a present invention.
Figure 2:
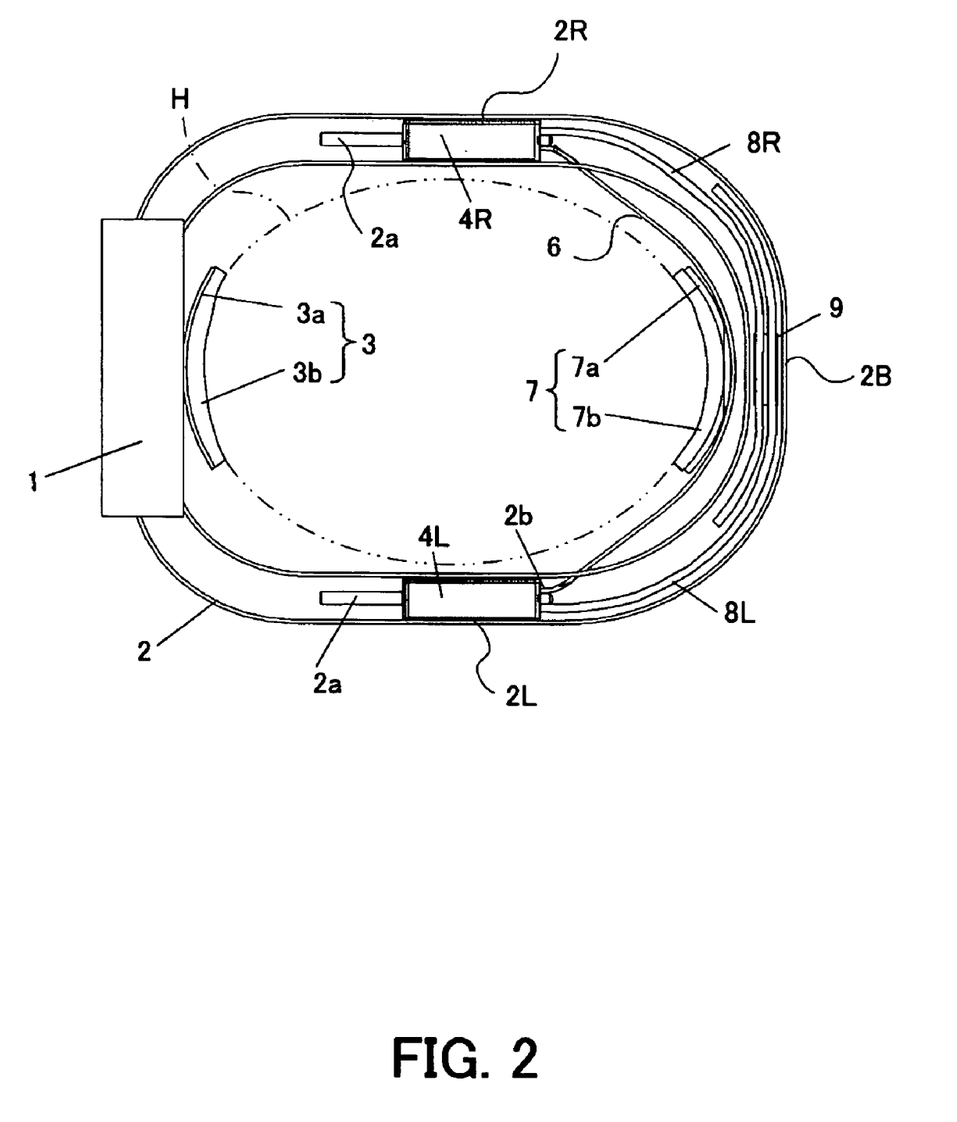
FIG. 2 is a top view showing an internal structure of a frame according to the first embodiment.

FIG. 1 shows a head mounted display as a head mounted apparatus according to a first embodiment of the present invention. FIG. 2 shows an internal structure of a frame in the mount mechanism in the head mounted display.

The head mounted display body or apparatus body 1 is arranged in front of a viewer's head H or eyes. Responsive to an image signal from an image supply apparatus 100, such as a personal computer ("PC") and a DVD player, the head mounted display body 1 includes, as shown in FIG. 1, an image on an inside display device, such as a liquid crystal panel. An inside optical system magnifies and displays the image on the display device.

In the following description, the front, back, left, right, top and bottom correspond to those of the head H mounted with the head mounted display. The longitudinal direction can be a direction from the front to the back, and the lateral direction can be a direction from the left to the right.

2 denotes a rigid frame that is integrated with or supports the head mounted display body 1, and has a shape fitting the circumference of the viewer's head H.

A front compressing portion 3 is compressed against the head H's front side or the frontal region is attached at an approximately center of the lateral direction to the inside surface of the head mounted display body 1 (which is a surface on the side of the viewer's eyes). The front compressing portion 3 includes a front-pad attachment plate 3a, and a front pad 3b adhered to the attachment plate 3a.

The frame 2 has a rectangular frame section around its perimeter, taken along the longitudinal direction. As shown in FIG. 2, left and right frame portions 2L and 2R extend in the longitudinal direction on the left and right sides of the head H in the frame 2 and house left and right adjusters 4L and 4R that are movable in the longitudinal direction along them.

A pair of grooves or openings 2a are formed in the bottom surfaces of the left and right frame portions 2L and 2R, into which operating levers 5L and 5R that extend from the left and right adjusters 4L and 4R are inserted.

One elastic band 6 is attached to each of the left and right adjusters 4L and 4R. The band 6 extends to the back of the inner space of the frame 2, in which the head H is inserted, through a pair of slit-shaped band outlets 2b formed on the inside surface of the left and right frame portions 2L and 2R. A back compressing portion 7 is attached to an approximately center of the band 6 as a back member, and includes a back-pad attachment plate 7a and a back pad 7b adhered to the attachment plate 7a. The back compressing portion 7 is compressed against the backside of the head H or the occipital region.

A front end of a right sub-band 8R is fixed onto the right adjuster 4R. A front end of a left sub-band 8L is fixed onto the left adjuster 4L. The left and right sub-bands 8L and 8R extend to the backside of the frame 2 or a back frame portion 2B through the insides of the left and right frame portions 2L and 2R. The backside portions of the left and right sub-bands 8L and 8R overlap each other in the longitudinal direction in the back frame portion 2B.

Figure 3:
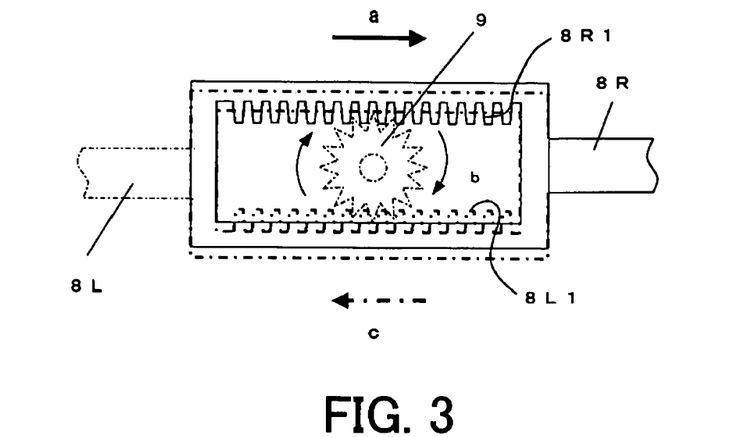
FIG. 3 is a front view of an interlock mechanism according to the first embodiment.

A rectangular frame is formed, as shown in FIG. 3, at the backside portion of the left and right sub-bands 8L and 8R. Rack cogs 8R1 are formed on the inner surface of the upper side portion of the rectangular frame in the right sub-band 8R. Rack cogs 8L1 are formed on the inner surface of the lower side portion of the rectangular frame in the left sub-band 8L.

A pinion gear 9 is arranged inside the rectangular frames of the left and right sub-bands 8L and 8R. The rack cogs 8L1 are engageable with an upper portion of the pinion gear 9, and the rack cogs 8L1 are engageable with a lower portion of the pinion gear 9. Both rack cogs 8R1 and 8L1 are engaged with the pinion gear 9 at opposite sides with respect to a rotating center of the pinion gear 9. These left and right sub-bands 8L and 8R, and the pinion gear 9 constitute an interlock mechanism.

The frame 2 serves as a guide that prevents the left and right bands 8L and 8R from bending beyond the necessary range.

Figure 4:
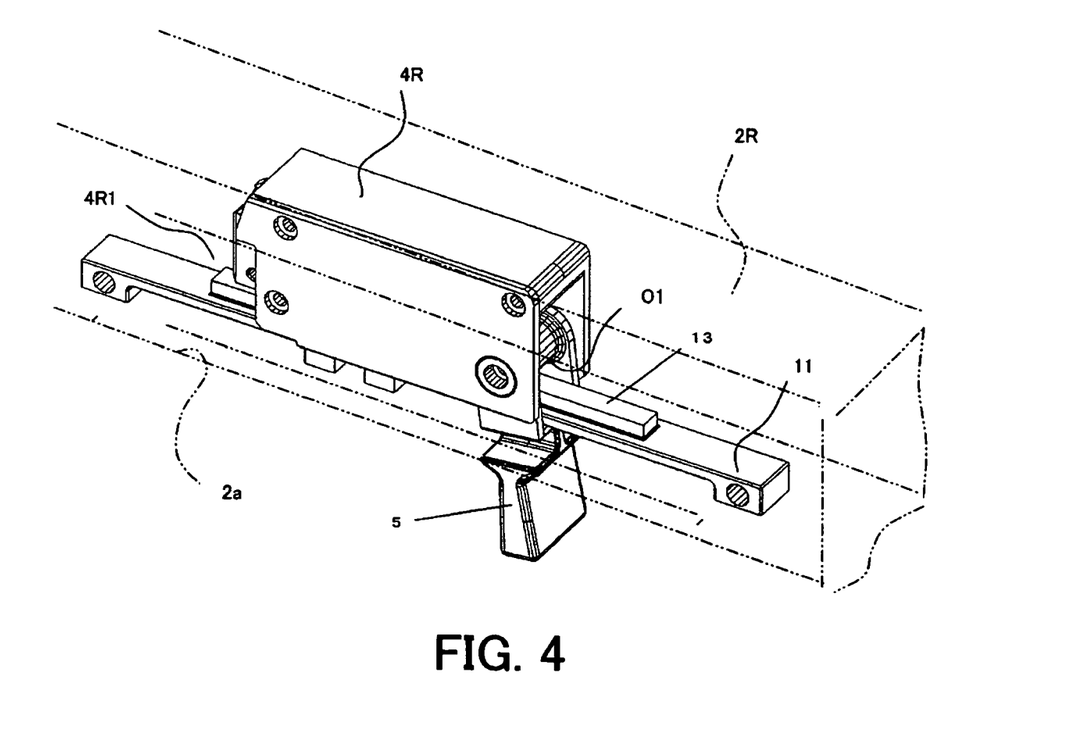
FIG. 4 is a perspective view of an adjuster according to the first embodiment.
Figure 5:
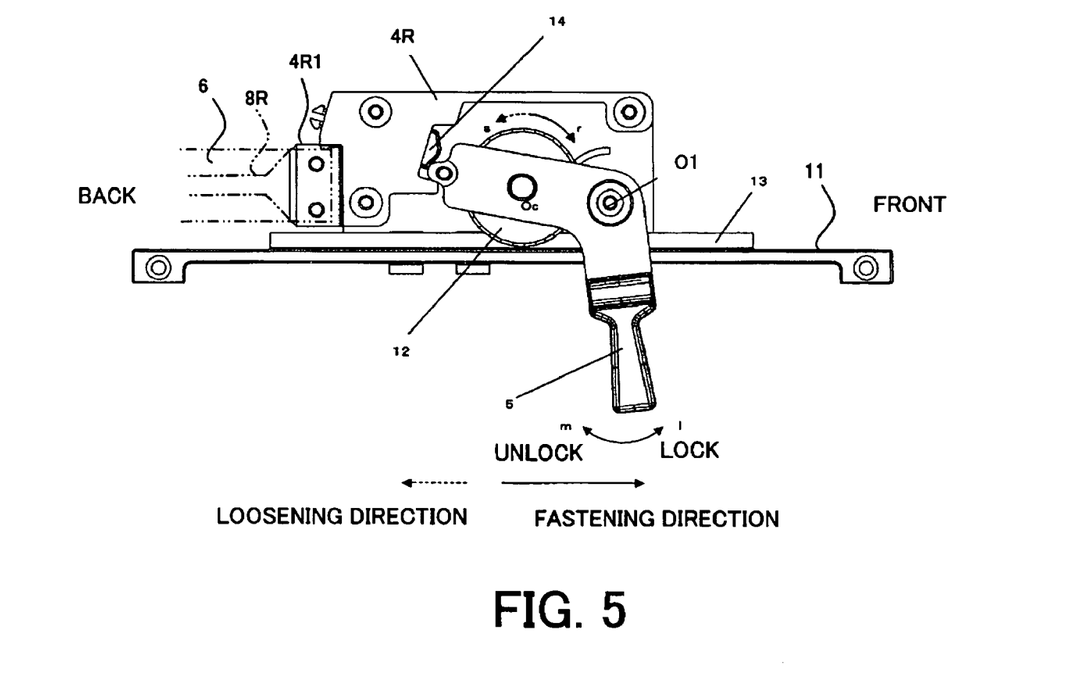
FIG. 5 is a side view of a lock mechanism in a lock state of a backward movement according to the first embodiment.
Figure 6:
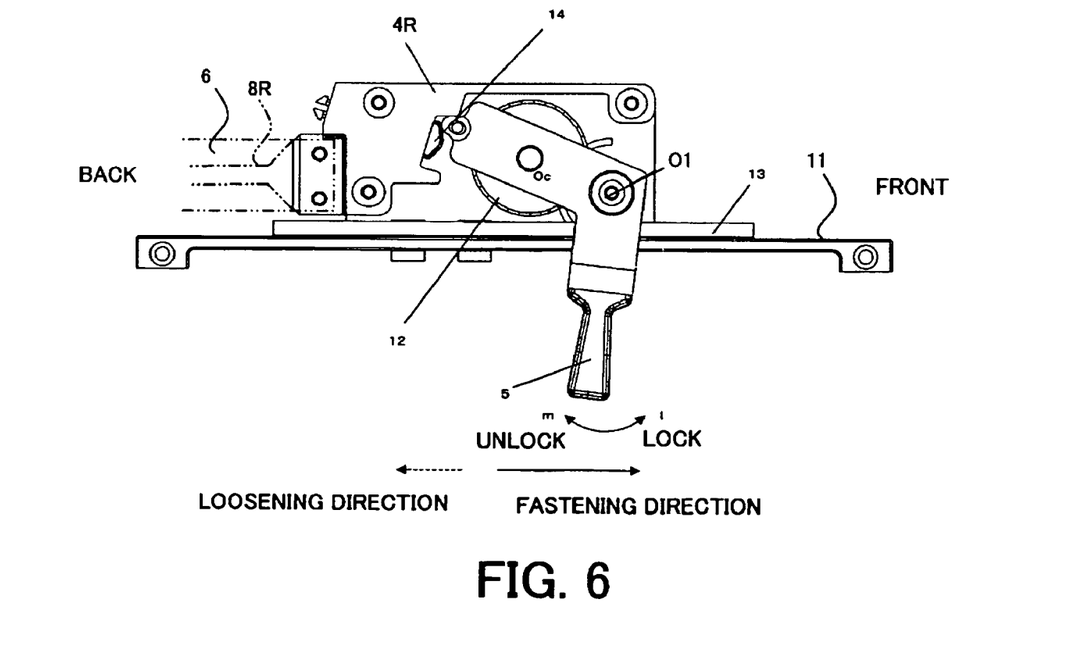
FIG. 6 is the side view of the lock mechanism in an unlock state according to the first embodiment.

The left and right adjusters 4L and 4R include a lock mechanism including a one-way clutch. Referring now to FIGS. 4 to 6, a structure of the lock mechanism will be discussed. Here, FIGS. 4 to 6 show the lock mechanism formed on the right adjuster 4R. In these figures, the right side denotes a front side and the left side denotes the backside. The lock mechanism of the left adjuster 4L is not shown, but has the same structure as the lock mechanism as the right adjuster 4R.

As shown in these figures, the right adjuster 4R has a box shape that opens in the front and back sides. 11 denotes a guide rail fixed on the bottom surface of the right frame 2R. 13 denotes a gear rack fixed on the top surface of the guide rail 11. Rack cogs (not shown) are formed on the side surface of the gear rack 13 and engageable with the one-way clutch gear 12, which will be described later. As shown in FIG. 5, a left end of the band 6 and a front end of the right sub-band 8R shown in FIGS. 1 and 2 are fixed onto a back portion 4R1 of the right adjuster 4R.

The operating lever 5 is supported around a shaft O1 in the right adjuster 4R so that the operating lever 5 can swing in the longitudinal direction. The one-way clutch gear 12 is attached around a shaft Oc in the right adjuster 4R in the lever 5, and has a unidirectional rotating lock structure that rotates in an "r" direction but does not rotate in an "s" direction. 14 denotes a lever lock provided inside the right adjuster 4R, serving to hold the lever 5 in the lock and unlock states. A spring (not shown) forces the lever lock 14 in the projecting direction to the side of the operating lever 5.

When the operating lever 5 is rotated in the front or "l" direction, the one-way clutch gear 12 is engaged with the gear rack 13. The one-way clutch gear 12 rotates only in the "r" direction and does not rotate in the "s" direction, as described above. The "r" direction is a rotating direction corresponding to a forward moving direction of the right adjuster 4R and a fastening direction of the head H with the front and back compressing portions 3 and 7. Therefore, in fastening the head H with the front and back compressing portions 3 and 7, the operating lever 5 is simply pushed forward to move forward the right adjuster 4R relative to the right frame portion 2R.

Even when the hand is separated from the operating lever 5 in the fastening state, the lever lock 14 holds the operating lever 5 in place shown in FIG. 5, and maintains fastening since the right adjuster 4R stays there due to the rotating lock function of the one-way clutch gear 12 in the "s" direction.

In loosening the head H, the operating lever 5 is rotated in an "m" direction, disengaging the one-way clutch gear 12 from the gear rack 13 as shown in FIG. 6, and unlocking the backward movement of the right adjuster 4R by the rotating lock function of the one-way clutch 12 in the "s" direction. The "m" direction is a backward direction and the same as the retreating direction of the right adjuster 4R in order to loosen the head H. Thus, the unlocking force for backward rotating of the operating lever 5 serves to retreat the right adjuster 4R and to loosen the head H, providing simpler loosening than two-step actions in which the unlocking direction is different from the loosening direction.

Once the operating lever 5 is rotated in the "m" direction to the position shown in FIG. 6, the lever lock 14 holds the operating lever 5 there.

As the right adjuster 4R is moved forward relative to the right frame portion 2R (in the head H fastening direction), the right sub-band 8R is pulled forward. Thereby, a rectangular frame of the right sub-band 8R shown in FIG. 3 moves in the "a" direction and the rack cogs 8R1 provided on the rectangular frame rotate the pinion gear 9 in the "b" direction. The pinion gear 9 that rotates in the "b" direction pushes out the left sub-band 8L in the "c" direction via the rack cogs 8L1 on the rectangular frame of the left sub-band 8L.

Thereby, the left adjuster 4L moves in the same (forward) direction as the right adjuster 4R in association with the right adjuster 4R. The left and right sub-band 8L and 8R are engaged with the same pinion gear 9, and the forward moving amount of the left adjuster 4L is the same as the moving amount of the right adjuster 4R. The "same" covers a correspondence and a slight difference, for example, due to backlashes between the pinion gear 9 and each of the rack cogs 8L1 and 8R1.

As the right adjuster 4R moves forward, the left adjuster 4L associatively moves with the same amount in the same direction. The back compressing portion 7 held by the left and right adjusters 4L and 4R via the band 6 does not laterally shift the front compressing portion 3, and narrows the interval between the front and back compressing portions 3 and 7 in fastening the head H. Therefore, a user comfortably and stably mounts the apparatus onto the head H. In addition, the interlock mechanism and the lock mechanism have a simple structure, and effectively make the head mounted display small and lightweight.

When the left adjuster 4L moves forward, the right adjuster 4R associatively moves in the same direction with the same moving amount, providing a similar effect.

This embodiment arranges the interlock mechanism at the frame back portion, and balances the weight of the entire head mounted display.

This embodiment uses the one-way clutch to allow the fastening operation and prevents a movement in the loosening direction, without generating noises during fastening unlike the ratchet mechanism, and with non-stepwise adjustments, instead of stepwise adjustments as in the ratchet mechanism.

The lever lock 14 holds the unlocking state, lessening arduousness during mounting: When a big-head person puts on the apparatus after a small-head person puts it on and the interval between the front and back compressing portions 3 and 7 is too small for the big-head person, the back compressing portion 7 retreats simply by inserting head between the front and back compressing portions 3 and 7.

The locking direction of the operating lever 5, the fastening direction of the back compressing portion 7, the unlocking direction of the operating lever 5, and the loosening direction of the back compressing portion 7 are accorded with one another. Thus, fastening and locking coincide, and unlocking and loosening coincide.

Only if the unlocking direction of the operating lever 5 is accorded with the loosening direction, the unlocking force can be used to move the adjuster. In other words, this embodiment sets the unlocking direction of the operating lever 5 to the backward direction, and the backward movements of the left and right adjusters 4L and 4R to the loosening direction. However, the unlocking direction of the operating lever 5 may be set to the forward direction, and the forward movements of the left and right adjusters 4L and 4R may be set to the loosening direction.

Second Embodiment

Figure 7:
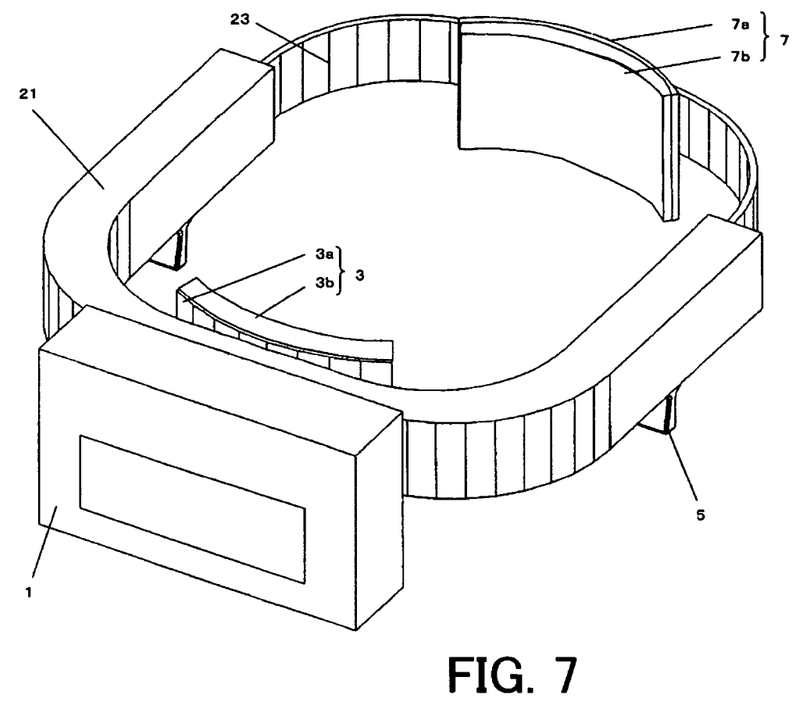
FIG. 7 is a perspective view of the head mounted apparatus system according to a second embodiment of the present invention.
Figure 8:
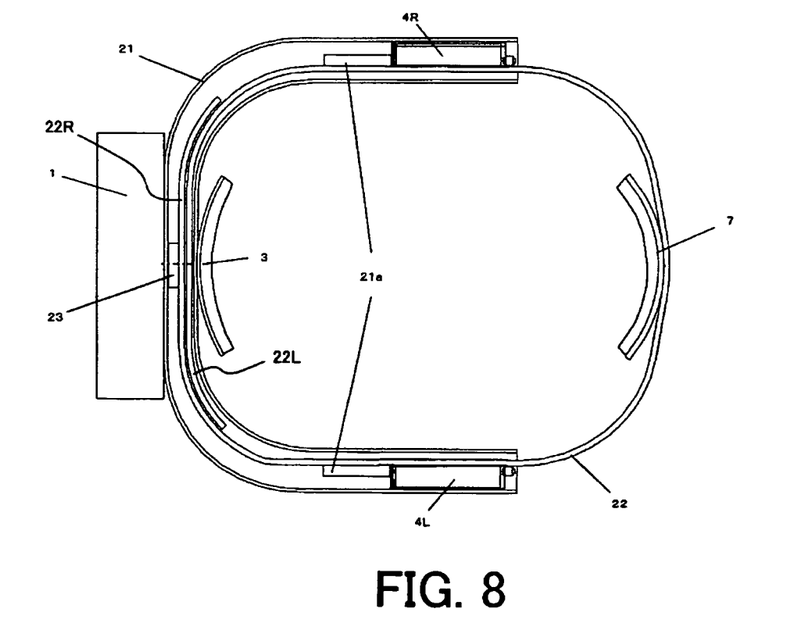
FIG. 8 is a top view of an internal structure of a frame according to the second embodiment.

FIG. 7 shows a head mounted display as a head mounted apparatus according to a second embodiment of the present invention. FIG. 8 shows an internal structure of a frame in the mount mechanism in the head mounted display. This embodiment designates the same reference numerals the elements similar to those in the first embodiment, and omits a description.

21 denotes a U-shaped frame shape when viewed from a top. The head mounted display body 1 is fixed onto a front portion of the frame 21. The front compressing portion 3 similar to that in the first embodiment is attached to an approximately center in the lateral direction on a plane opposite to the head mounted display 1 at the front portion of the frame 21. The frame 21 has a rectangular frame section in the longitudinal direction, similar to the first embodiment.

The left and right adjuster 4L and 4R are housed in longitudinally extending portions at the left and right sides of the frame 21 or in the left and right frame portions 21L and 21R. A pair of groove openings 21a are formed in the bottom surfaces of the left and right frame parts 21L and 21R, into which operating levers 5L and 5R are inserted. The left and right adjusters 4L and 4R and the lock mechanism provided to each adjuster are similar to those in the first embodiment.

22 denotes a band 6 that encloses the head's circumference. Front (end) portions of the band 22 (in the longitudinal direction) is housed in the frame 21, and a back portion (at the center peripheral portions in the longitudinal direction) extends from the back end openings of the left and right frame parts 21L and 21R to the backside. The back compressing portion 7 described in the first embodiment is attached to an approximately center of the band 22. The left end portion 22L and the right end portion 22R of the band 22 overlap each other in the longitudinal direction at the front portion in the frame 21, and extend in the lateral direction.

The left and right adjusters 4L and 4R are connected to longitudinally extending portions in the left and right frame portions 21L and 21R in the band 22.

Figure 9:
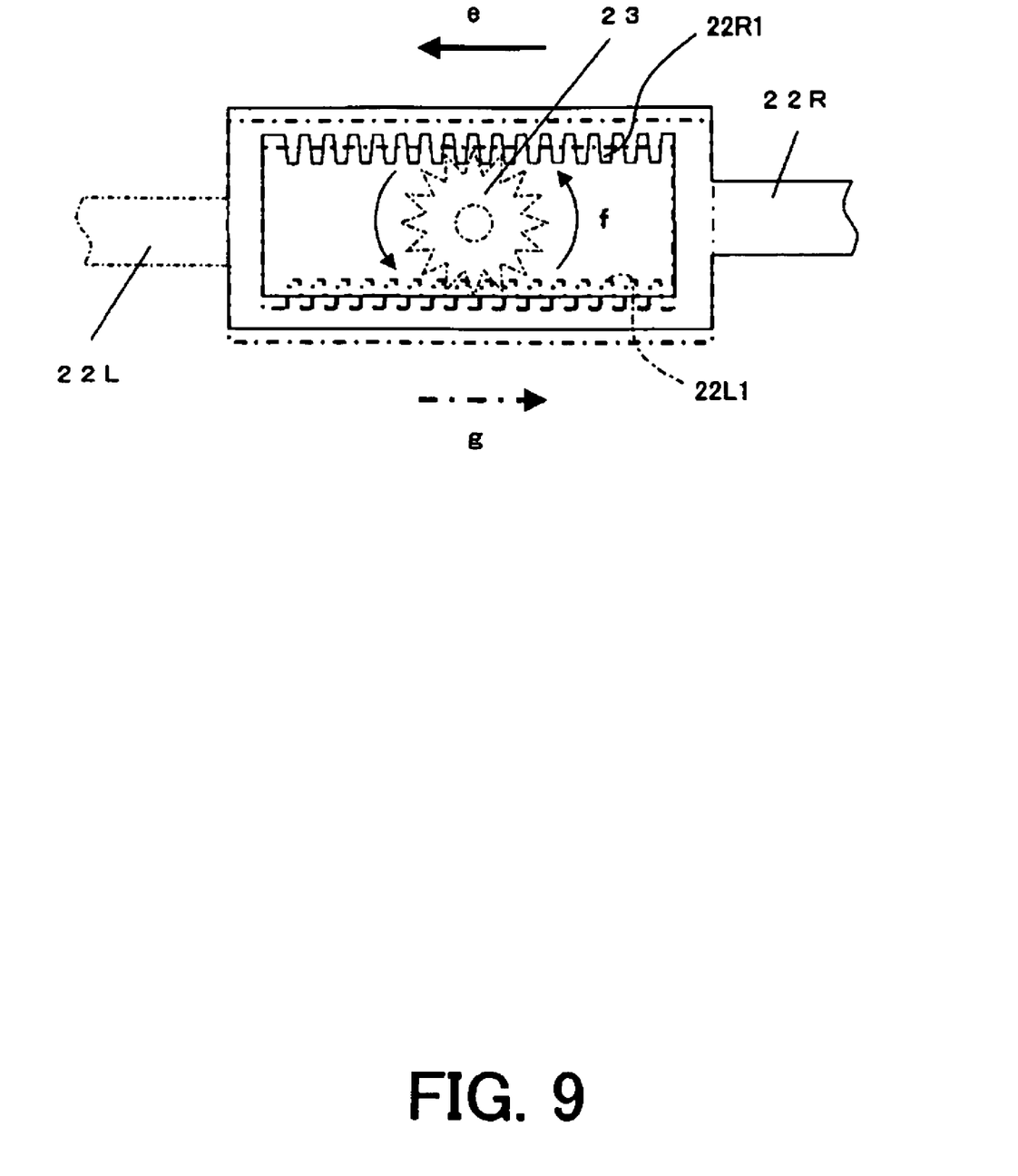
FIG. 9 is a front view of an interlock mechanism according to the second embodiment.

The left and right end portions 22L and 22R in the band 22 have a rectangular frame shown in FIG. 9. Rack cogs 22R1 are formed on the inner surface of the upper side portion of the rectangular frame in the right end portion 22R. Rack cogs 22L1 are formed on the inner surface of the lower side portion of the rectangular frame in the left end portion 22L.

The pinion gear 23 is provided in the rectangular frame of the left and right end portions 22L and 22R. The pinion gear 23 rotates around a rotating shaft that extends in the longitudinal direction. The rack cogs 22L1 provided on the left end portion 22L and the rack cogs 22R1 provided on the right end portion 22R are engaged with the pinion gear 23 opposite to each other with respect to an approximately center in the front portion in the frame 21. These bands 22 (rack cogs 22L1 and 22R1) and pinion gear 23 constitute an interlock mechanism.

The frame 21 serves as a guide that prevents the band 22 from bending beyond a necessary amount.

Since this structure uses only one band 22 and eliminates the back frame portion, this embodiment can effectuate a lighter weight than the first embodiment.

For example, when the right operating lever 5 is pushed forward and the right adjuster 4R is moved forward relative to the right frame portion 2R in this embodiment, the right end portion 22R in the band 22 moves in an "e" direction in FIG. 9 and the pinion gear 23 rotates in an "f" direction. The pinion gear 23 that rotates in the "f" direction withdraws the left end portion 22L in a "g" direction via the rack cogs 22L1 provided on the left end portion 22L.

In this embodiment similar to the first embodiment, the left adjuster 4L associates with the right adjuster 4R and moves forward in the same direction as the moving direction of the right adjuster 4R. Thereby, the back compressing portion 7 moves forward. The rack cogs 22L1 and 22R1 of the left and right end portions 22L and 22R in the band 22 are engaged with the same pinion gear 23, and the forward moving amount of the left adjuster 4L is the same as the moving amount of the right adjuster 4R. The "same" covers a correspondence and a slight difference, for example, due to backlashes between the pinion gear 23 and each of the rack cogs 22L1 and 22R1. Thus, the back compressing portion 7 does not laterally shift relative to the front compressing portion 3, in fastening the head. Therefore, a user can stably and comfortably mount the apparatus onto the head H. Similar to the first embodiment, the interlock mechanism and the lock mechanism have a simple structure, and can effectively make the head mounted display small and lightweight.

Even when the left adjuster 4L moves forward, the right adjuster 4R associatively moves in the same direction with the same moving amount, providing a similar effect. The loosening manipulation is the same as that in the first embodiment.

While each embodiment discusses the head mounted display, the present invention is not limited to the head mounted display and is applicable to a head mounted image pickup apparatus and another head mounted apparatus, such as a sensing device that detects a movement of the head. The inventive interlock mechanism is not limited to those in the above embodiments, but may use another structure.

This application claims a foreign priority benefit based on Japanese Patent Application No. 2005-194623, filed on Jul. 4, 2005, which is hereby incorporated by reference herein in its entirety as if fully set forth herein.

What is claimed is:

1. A head mounted apparatus mounted on a head of a user, said head mounted apparatus comprising:
   an apparatus body to be mounted on a front side of the head;
   a frame for supporting said apparatus body, said frame extending in a longitudinal direction at both sides of the head when said frame is mounted on the head;
   a front compressing portion provided on said frame or said apparatus body, and compressed against a frontal region of the head;
   first and second adjusters provided at both sides of said frame so that said first and second adjusters can move in the longitudinal direction relative to said frame;
   a back member that includes a back compressing portion compressed against an occipital region of the head, and is held by said first and second adjusters; and
   an interlock mechanism for enabling, as one of said first and second adjusters moves relative to said frame, the other of said first and second adjusters to move with the same moving amount relative to said frame in the same direction as the one;
   wherein each of said first and second adjusters includes a lock mechanism for locking and unlocking a unidirectional movement of said adjuster in the longitudinal direction relative to said frame, and
   wherein an unlocking direction of the lock mechanism is the same as a direction of the unidirectional movement.

2. A head mounted apparatus according to claim 1, wherein said interlock mechanism includes first and second members, and a pinion engageable with rack cogs formed on the first and second members, the first and second members each having one end fixed onto the first and second adjusters, and
   wherein the rack cogs of the first and second members are engaged with the pinion at opposite sides of the pinion.

3. A head mounted apparatus according claim 1, wherein the lock mechanism includes a one-way clutch for allowing said adjuster to move in a first direction along the longitudinal direction relative to said frame, and for locking said adjuster in a second direction along the longitudinal direction opposite to the first direction.

4. A head mounted apparatus according claim 1, wherein said adjuster includes a mechanism for holding the lock mechanism in an unlocking state.

5. A head mounted apparatus according to claim 1, wherein said apparatus body displays an image.

6. A head mounted apparatus mounted on a head of a user, said head mounted apparatus comprising:
   an apparatus body to be mounted on a front side of the head;
   a frame for supporting said apparatus body, said frame extending in a longitudinal direction at both sides of the head when said frame is mounted on the head;
   a front compressing portion provided on said frame or said apparatus body, and compressed against a frontal region of the head;
   first and second adjusters provided at both sides of said frame so that said first and second adjusters can move in the longitudinal direction relative to said frame, each adjuster including a lock mechanism for locking and unlocking a unidirectional movement of said adjuster in the longitudinal direction relative to said frame, an unlocking direction of the lock mechanism being the same as a direction of the unidirectional movement; and
   a back member that includes a back compressing portion compressed against an occipital region of the head, and is held by said first and second adjusters.

7. A head mounted apparatus according to claim 6, wherein the lock mechanism includes a one-way clutch for allowing said adjuster to move in a first direction along the longitudinal direction relative to said frame, and for locking said adjuster in a second direction along the longitudinal direction opposite to the first direction.

8. A head mounted apparatus according to claim 6, wherein said adjuster further includes a mechanism for holding the lock mechanism in an unlocking state.

9. A head mounted apparatus according to claim 6, wherein said apparatus body displays an image.

* * * * *